(12) United States Patent
Kipp (10) Patent No.: US 9,461,768 B2
(45) Date of Patent: Oct. 4, 2016

(54) TERABIT TOP-OF-RACK SWITCH

(71) Applicant: BROCADE COMMUNICATIONS SYSTEMS, INC., San Jose, CA (US)

(72) Inventor: Scott G. Kipp, Santa Barbara, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 262 days.

(21) Appl. No.: 13/899,440

(22) Filed: May 21, 2013

(65) Prior Publication Data

US 2013/0315586 A1 Nov. 28, 2013

Related U.S. Application Data

(60) Provisional application No. 61/650,906, filed on May 23, 2012.

(51) Int. Cl.
*H04J 14/00* (2006.01)
*H04Q 11/00* (2006.01)

(52) U.S. Cl.
CPC ........... *H04J 14/00* (2013.01); *H04Q 11/0005* (2013.01)

(58) Field of Classification Search
CPC ................ H04J 14/00; H04J 14/0252; H04Q 11/0001–11/0005; H04Q 2011/0071; H04Q 2011/009
USPC .......................................................... 398/45
See application file for complete search history.

(56) References Cited

U.S. PATENT DOCUMENTS

| | | | | |
|---|---|---|---|---|
| 5,879,173 A * | 3/1999 | Poplawski | ........... | G02B 6/4277 385/92 |
| 5,995,262 A * | 11/1999 | Hirota | ...................... | G02B 6/00 385/131 |
| 6,571,355 B1 * | 5/2003 | Linnell | ............... | G06F 11/2005 714/4.2 |
| 6,583,902 B1 * | 6/2003 | Yuen | ...................... | H04B 10/40 398/135 |
| 7,062,177 B1 * | 6/2006 | Grivna | ............... | H04B 10/2581 398/16 |
| 8,798,045 B1 * | 8/2014 | Aybay | ................... | H04L 49/357 370/386 |
| 8,918,631 B1 * | 12/2014 | Kumar | ................ | H04L 12/4641 370/254 |
| 2006/0209886 A1 * | 9/2006 | Silberman | ............ | H01R 31/065 370/466 |
| 2007/0074052 A1 * | 3/2007 | Hemmah | ................ | H04L 12/10 713/300 |
| 2007/0238343 A1 * | 10/2007 | Velleca | ................ | H01R 9/2475 439/188 |
| 2007/0280223 A1 * | 12/2007 | Pan | ...................... | H04L 12/6418 370/360 |
| 2008/0057918 A1 * | 3/2008 | Abrant | .................... | H04H 20/26 455/414.1 |
| 2008/0112133 A1 * | 5/2008 | Torudbakken | ........... | H04Q 1/04 361/694 |
| 2009/0249444 A1 * | 10/2009 | Macauley | .............. | H04Q 1/138 726/3 |
| 2009/0252503 A1 * | 10/2009 | Ishigami | ................ | H04B 10/40 398/200 |
| 2010/0002382 A1 * | 1/2010 | Aybay | ................ | H05K 7/20563 361/695 |
| 2010/0254703 A1 * | 10/2010 | Kirkpatrick | ........ | H04Q 11/0005 398/45 |
| 2010/0284698 A1 * | 11/2010 | McColloch | .......... | G02B 6/4201 398/135 |
| 2011/0007738 A1 * | 1/2011 | Berman | .................. | H04L 49/30 370/355 |

(Continued)

OTHER PUBLICATIONS

"7500 Series Data Center Switch", Arista Networks, Inc., 2013.*

(Continued)

*Primary Examiner* — Danny Leung
(74) *Attorney, Agent, or Firm* — Shun Yao; Park, Vaughan, Fleming & Dowler LLP (57) ABSTRACT

One embodiment of the present invention provides a switch. The switch includes a printed circuit board (PCB), a number of multi-channel optical transceivers mounted on the PCB, and a number of switch ports accessible from a front panel of the switch. The switch ports include a number of electrical interfaces that are electrically coupled to a switch chip mounted on the PCB, and a number of optical interfaces that are coupled to the switch chip via the multi-channel optical transceivers.

20 Claims, 7 Drawing Sheets

(56) References Cited

U.S. PATENT DOCUMENTS

| | | | | |
|---|---|---|---|---|
| 2011/0149526 | A1* | 6/2011 | Turner | H05K 7/207 361/730 |
| 2012/0099863 | A1* | 4/2012 | Xu | H04Q 11/0005 398/49 |
| 2013/0135811 | A1* | 5/2013 | Dunwoody | G06F 1/189 361/679.31 |
| 2013/0156425 | A1* | 6/2013 | Kirkpatrick | H04B 10/801 398/45 |
| 2013/0315586 | A1* | 11/2013 | Kipp | H04J 14/00 398/45 |

OTHER PUBLICATIONS

Farrington, N.; Rubow, E.; Vahdat, A., "Data Center Switch Architecture in the Age of Merchant Silicon," High Performance Interconnects, 2009. HOTI 2009. 17th IEEE Symposium on, vol., No., pp. 93, 102, Aug. 25-27, 2009.*

B.G. Lee, et al. "Broadband Silicon Photonic Switch Integrated with CMOS Drive Electronics", 2010.

"Arista Introduces the Industry's Fastest Data Center Switch", May 1, 2013, http://www.aristanetworks.com/en/news/pressrelease/568-pr-20130501-01.

"Applications for Embedded Optic Modules in Data Communications", Avago Technologies, Mar. 25, 2011.

"Transferring High-Speed Data over Long Distances with Combined FPGA and Multichannel Optical Modules", Avago Technologies, Mar. 21, 2012.

"A Demonstration of PCI Express Generation 3 over a Fiber Optical Link", Avago Technologies, Jul. 3, 2012.

"Fiber Optic Solutions for Networking and Industrial Applications" Avago Technologies, Oct. 2, 2012.

\* cited by examiner

TERABIT TOP-OF-RACK SWITCH

RELATED APPLICATION

This application claims the benefit of U.S. Provisional Application No. 61/650,906, entitled "TERABIT TOP-OF-RACK SWITCH," by inventor Scott Kipp, filed 23 May 2012, the disclosures of which are incorporated by reference herein.

BACKGROUND

1. Field

The present disclosure relates to a switch. More specifically, the present disclosure relates to a top-of-rack (TOR) switch with embedded optics to provide terabit per second capacity.

2. Related Art

In the past decade, cloud computing has experienced a tremendous growth, mostly due to the ubiquitous availability of high-capacity networks, low-cost computers and storage devices, as well as the widespread adoption of hardware virtualization and service-oriented architecture. It is estimated that the global cloud computing market is growing at a 27.6% compound annual growth rate (CAGR), likely reaching $72.8 billion in 2015. Such a rapid growth in cloud computing also requires rapid development in modern data centers. More specifically, it is desirable to build data center infrastructure in a modular fashion in order to increase data center flexibility.

Figure 1:
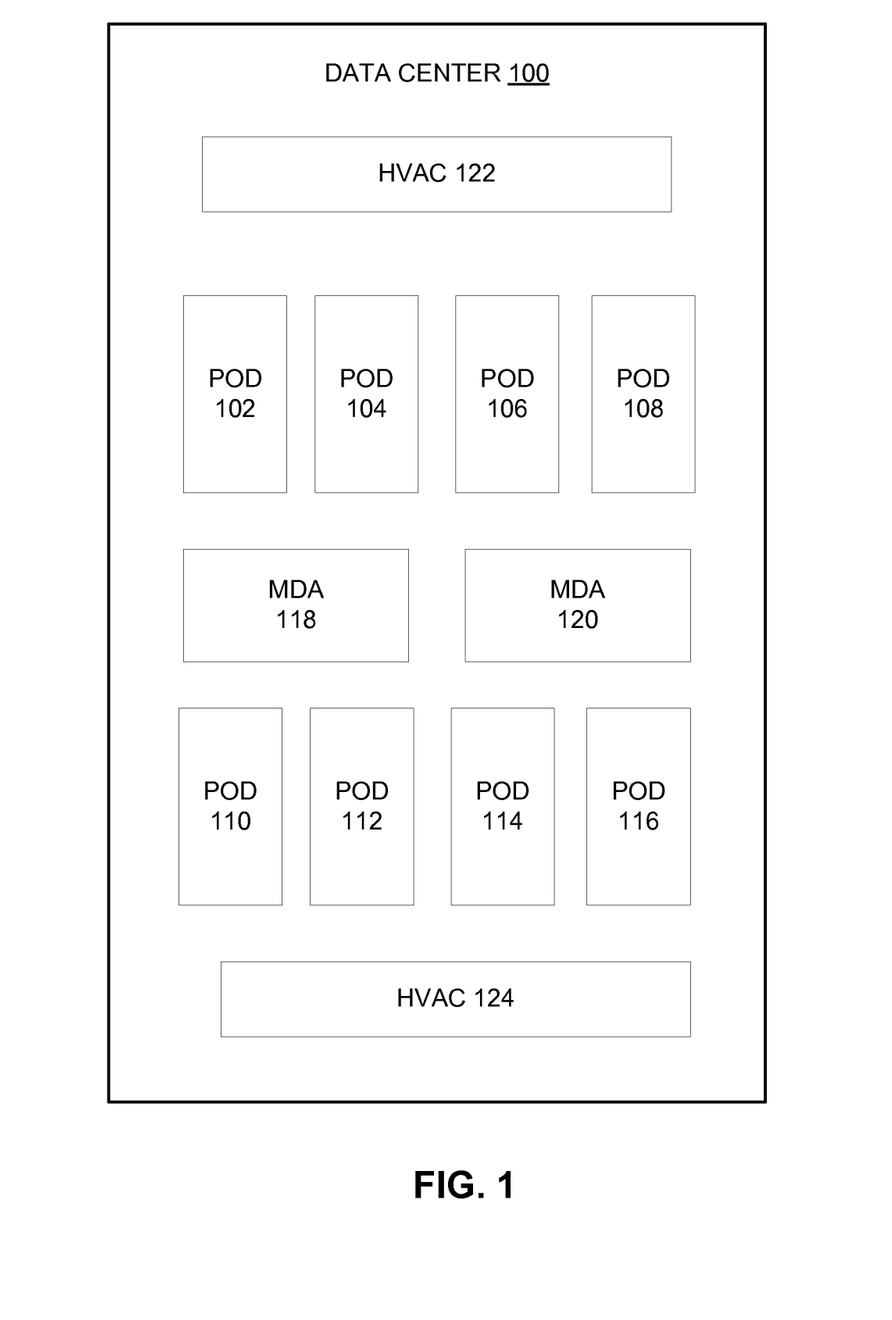
FIG. 1 presents a diagram illustrating an exemplary pod-based data center.

Many existing mega data centers are designed with a pod (or cell) architecture. Under the pod concept, each data center facility is divided into a number of pods, with each pod built to the same specifications. FIG. 1 presents a diagram illustrating an exemplary pod-based data center. In FIG. 1, data center 100 includes a number of pods, such as pods 102, 104, 106, 108, 110, 112, 114, and 116; a number of main distribution areas (MDAs), such as MDAs 118 and 120; and a number of heating, ventilation, and air conditioning (HVAC) systems, such as HVAC systems 122 and 124. Note that a pod can be a self-contained group of racks that optimize power, cooling, and cabling efficiencies. MDAs interconnect the pods and provide connections to the telecommunications networks, such as a wide area network (WAN) or a local area network (LAN).

In FIG. 1, each pod can include one or more server racks, with each server rack holding tens of servers. Note that a typical full-sized rack includes 42 rack units (RUs), with 40 RUs used for holding servers and the top 2 RUs used for holding the top-of-rack (TOR) switch. Typical TOR switches are 1 RU switches that are placed at the top position in the rack and connect to all servers in that rack. Conventional servers often take up 1 RU for each server, and a full rack may hold up to 40 servers. However, recent development efforts in advanced RISC machine (ARM) servers result in more energy-efficient and smaller servers, and multiple ARM servers can fit in 1 RU. Hence, a full rack may now hold up to 80 servers. Now, considering each server may require up to 20 Gbps bandwidth, each server rack can require up to 1.6 Tbps bandwidth. Conventionally built TOR switches cannot meet such a bandwidth requirement.

SUMMARY

One embodiment of the present invention provides a switch. The switch includes a printed circuit board (PCB), a plurality of multi-channel optical transceivers mounted on the PCB, and a plurality of switch ports accessible from a front panel of the switch. The switch ports include at least one electrical interface that is electrically coupled to a switch chip mounted on the PCB, and at least one optical interface that is coupled to the switch chip via a respective multi-channel optical transceiver.

In a variation on this embodiment, the switch is a top-of-rack switch that fits in one standard rack unit, and the top-of-rack switch is used in a data center.

In a variation on this embodiment, the switch chip includes at least 128 10-Gigabit Ethernet (10 GbE) ports.

In a further variation, the optical interface is coupled to 12 10 GbE ports of the switch chip.

In a further variation, the optical interface can be configured to act as one of: a 100 GbE port, three 40 GbE ports, and 12 10 GbE ports.

In a variation on this embodiment, the electrical interface includes an enhanced small form-factor pluggable (SFP+) interface.

In a variation on this embodiment, the optical interface includes a multi-fiber push on (MPO) interface for 24 optical fibers.

In a variation on this embodiment, the MPO interface is coupled to the respective multi-channel optical transceiver via a fiber optic ribbon cable.

In a variation on this embodiment, the switch chip further includes a number of Fibre Channel (FC) ports.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, a top-of-rack (TOR) switch utilizes embedded parallel optics, such as multi-channel optical transceivers, to provide high-density switch ports. In some embodiments, the TOR switch includes one 128-port switch chip with each port providing up to 10 Gbps bandwidth to yield a total bandwidth of 1.28 Tbps. The TOR switch also includes a number of high-density optical interfaces and a number of traditional enhanced small form-factor pluggable (SFP+) optical transceiver interfaces. More specifically, a multi-fiber push on (MPO) connector can provide connections for up to 12 switch ports (with one uplink and one downlink per port). In one embodiment, eight sets of MPO connectors provide connections to 96 switch ports, and 32 SFP+ ports provide connections to the other 32 switch ports. Each MPO port can be configured to support 12 ports running at 10 Gbps, two ports running at 40 Gbps, or one port running at 100 Gbps.

In this disclosure, the term "rack" refers to a standardized frame or enclosure for mounting multiple equipment modules. It can refer to a 19-inch rack, a 23-inch rack, or other types of racks with standardized size requirement.

Switch Configuration

As previously discussed, the size of a typical TOR switch is limited to the size of 1 RU, which means that the size of its front panel, where hot-pluggable connectors to servers are located, is limited as well. For a 19-inch rack, the size of the front panel of a switch that occupies 1 RU is roughly $19 \times 1.75 = 33.25$ inch$^2$. This limited size means that, despite design and fabrication advances for large-capacity (beyond 1 Tbps) switch chips, the TOR switch can provide only limited bandwidth because fewer than the desired number of ports or connectors can fit on the front panel of the TOR switch. For example, SFP+ interfaces have been the preferred interface for providing data rates up to 10 Gbps. However, although SFP+ has been considered a compact solution, it is extremely difficult to fit over 100 SFP+ ports onto the front panel of a TOR switch. Note that, as discussed earlier, to obtain a bandwidth of 1 Tbps and beyond, we need at least 100 ports, each running at 10 Gbps.

In order to overcome the size limitation of the TOR switch, in some embodiments of the present invention, a number of high-density, multi-channel optical transceivers, such as MicroPOD™ or MiniPOD™ (trademarks of Avago Technologies of San Jose, Calif.), are integrated onto the same printed circuit board (PCB) that mounts the switch application-specific integrated circuit (ASIC) chip. Each high-density, multi-channel optical transceiver interfaces with multiple ports on the switch ASIC chip. In one embodiment, a high-density, multi-channel transceiver may include 12 channels, with each channel having a bandwidth of 10 Gbps. The inputs/outputs of the high-density, multi-channel optical transceivers are coupled to multi-channel fiber optic ribbon cables, such as PRIZM® (registered trademark of US Conec Ltd. of Hickory, N.C.) ribbon fiber cables (or ribbon fibers with PRIZM® connectors). The other end of the ribbon cables is coupled to standardized MPO connectors, such as MTP® connectors (registered trademark of US Conec Ltd. of Hickory, N.C.), located on the front panel of the TOR switch. In some embodiments, an MPO connector can provide connections for up to 24 fibers, which can be used to couple to up to 12 10 Gbps server ports, with two fibers per port (one for the uplink and one for the downlink).

Figure 2A:
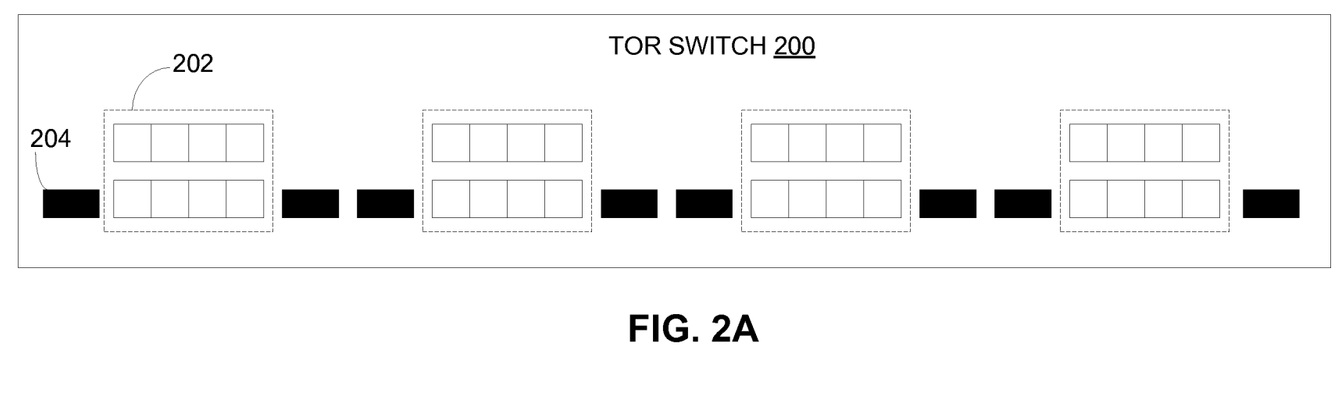
FIG. 2A presents a diagram illustrating the front panel of an exemplary TOR switch, in accordance with an embodiment of the present invention.

FIG. 2A presents a diagram illustrating the front panel of an exemplary TOR switch, in accordance with an embodiment of the present invention. In FIG. 2A, TOR switch 200 includes a number of SFP+-port clusters, such as a cluster 202; and a number of MPO interfaces, such as an MPO interface 204.

Each SFP+-port cluster includes a number of SFP+ ports. In one embodiment, TOR switch 200 includes 32 SFP+ ports, divided into four clusters. Note that each cluster of SFP+ ports includes two rows in order to effectively use the front panel space. Each SFP+ port has a bandwidth of 10 Gbps, and the 32 SFP+ ports provide an aggregated bandwidth of 320 Gbps. Note that by including the traditional SFP+ ports, TOR switch 200 effectively uses the flexibility provided by the SFP+ ports, which enables any subscription model and allows an optical reach of up to 10 km.

In one embodiment, each MPO interface couples to a 24-channel fiber ribbon. Note that these 24 fibers can couple to up to 12 10 Gbps server ports, with two fibers per port (one for the uplink and one for the downlink). Hence, each MPO interface can enable an aggregated bandwidth of 120 Gbps. In FIG. 2A, TOR switch 200 includes eight MPO interfaces, together providing a bandwidth of 960 Gbps. The combined bandwidth of TOR switch 200 is 1.28 Tbps.

Figure 2B:
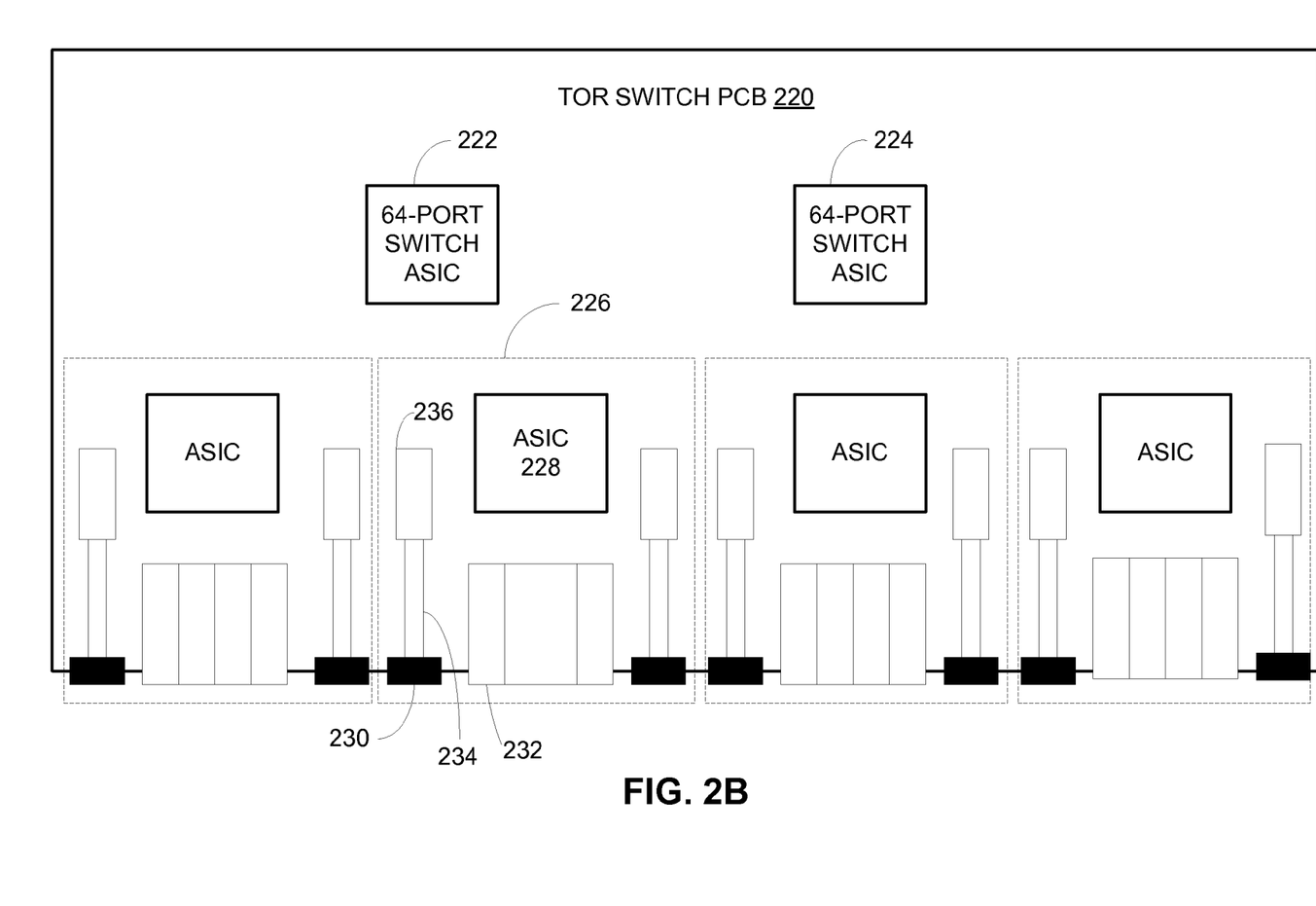
FIG. 2B presents a diagram illustrating an exemplary printed circuit board (PCB) configuration for a TOR switch, in accordance with an embodiment of the present invention.

FIG. 2B presents a diagram illustrating an exemplary printed circuit board (PCB) configuration for a TOR switch, in accordance with an embodiment of the present invention. In FIG. 2B, TOR switch PCB 220 includes a number of switch ASIC chips, such as ASIC chips 222 and 224. In one embodiment, each of ASIC chips 222 and 224 has 64 ports, and each port has a bandwidth of 10 Gbps. ASIC chips 222 and 224 function as the core switch chips.

In addition to the core switch chips, TOR switch PCB 220 includes a number of input/output function blocks, such as an input/output function block 226. Each input/output function block includes an aggregation switch chip, such as an ASIC chip 228, and a number of input/output interfaces mounted on the edge of TOR switch PCB 220 and accessible from the front panel of the TOR switch. The aggregation switch chip can be a 32-port or a 64-port switch chip. In the example shown in FIG. 2B, each input/output function block can include two MPO interfaces, such as an MPO interface 230; and eight SFP+ interfaces, such as an SFP+ interface 232 (note that only the top four of the eight SFP+ interfaces are visible in FIG. 2B). The eight SFP+ interfaces, each having a bandwidth of 10 Gbps, are electrically coupled to eight corresponding ports on the aggregation switch chip. The MPO interfaces are optical interfaces, each capable of connecting up to 24 optical fibers. In the example shown in FIG. 2B, each MPO interface can be coupled to 12 ports on the aggregation switch chip via one or more of high-density, multi-channel optical transceivers. For example, MPO interface 230 couples to ASIC chip 228 via a pair of 12-channel high-density optical transceivers, shown as a transceiver block 236 in FIG. 2B. The coupling between the optical transceivers and the MPO interface is provided by ribbon fibers, shown as a fiber block 234 in FIG. 2B. Note that each 12-channel high-density optical transceiver occupies 12 channels of the MPO interface, and transceiver block 236 (which includes a pair of 12-channel high-density optical transceivers) provides coupling between MPO interface 230 and 12 corresponding ports on ASIC chip 228. Hence, each input/output function block provides coupling for up to $2 \times 12 + 8 = 32$ switch ports, each having a bandwidth of 10 Gbps. In the example shown in FIG. 2B, four input/output function blocks together provide coupling for $32 \times 4 = 128$ switch ports and an aggregated bandwidth of 1.28 Tbps.

Figure 3A:
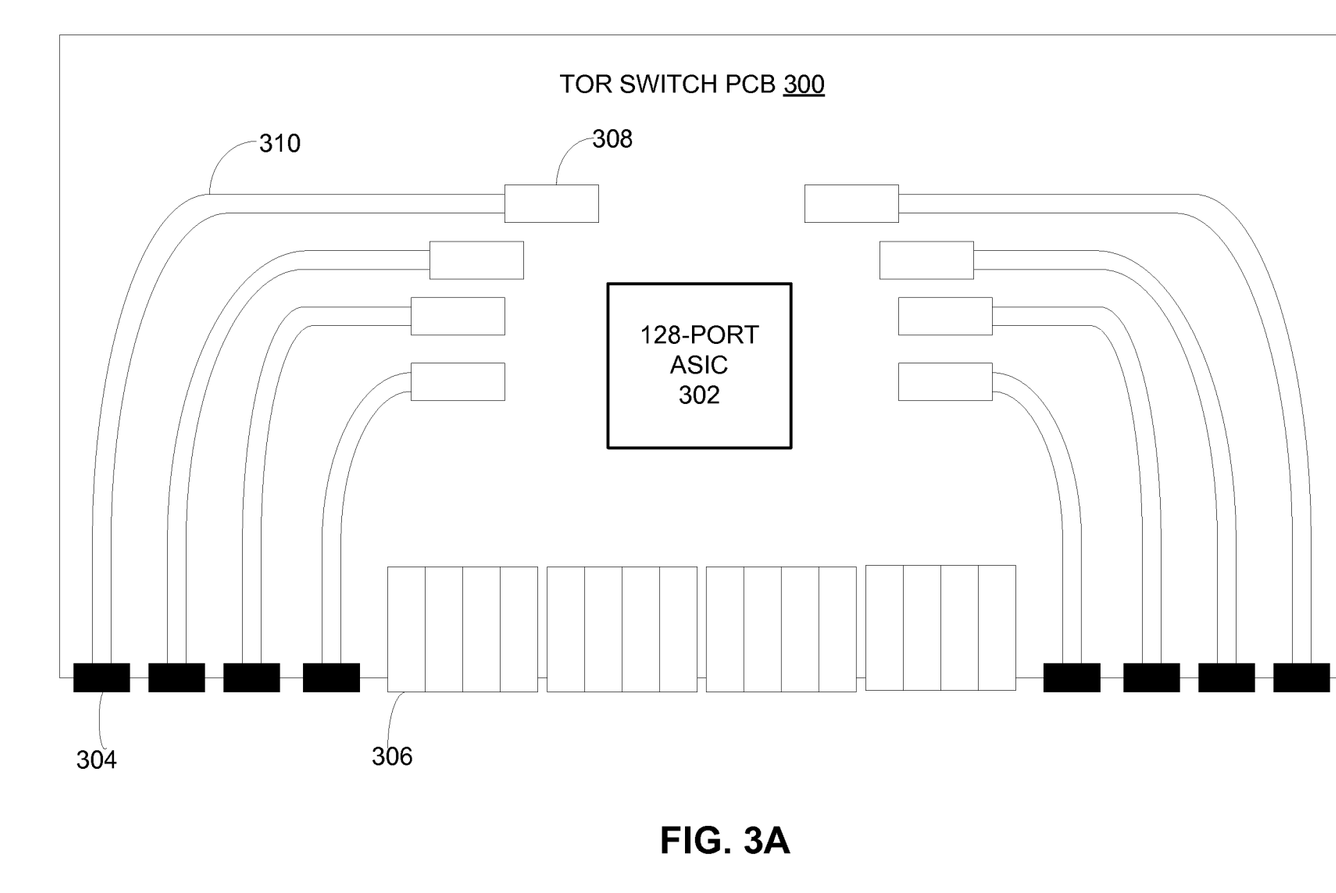
FIG. 3A presents a diagram illustrating an exemplary printed-circuit board (PCB) configuration for a TOR switch, in accordance with an embodiment of the present invention.

Recent advances in the design and fabrication of large-capacity (beyond 1 Tbps) switch ASIC chips have provided a 128-port switch on a single ASIC chip, with each port capable of carrying a data stream at 10 Gbps. The single 28-port switch chip has enabled simpler and more flexible PCB design. FIG. 3A presents a diagram illustrating an exemplary printed circuit board (PCB) configuration for a TOR switch, in accordance with an embodiment of the present invention. In FIG. 3A, TOR switch PCB 300 includes a 128-port switch ASIC chip 302; a number of MPO interfaces, such as an MPO interface 304; and a number of SFP+ interfaces, such as an SFP+ interface 306. Both the MPO interfaces and the SFP+ interfaces are accessible from the front panel of the TOR switch. In one embodiment of the present invention, TOR switch PCB 300 includes eight MPO interfaces and 32 SFP+ interfaces. Note that, in FIG. 3A, only 16 SFP+ interfaces are visible.

As discussed earlier, the SFP+ interfaces provide subscription flexibility and long (up to 10 km) optical reach. The customer can choose his own transceivers (optical or electrical) based on his needs. The 32 SFP+ interfaces can provide an aggregated bandwidth of up to 320 Gbps. Each MPO interface supports 24 fibers, and can be coupled to 12 switch ports (two fibers per port) on ASIC chip 302. For example, MPO interface 304 can be coupled to the corresponding 12 switch ports on ASIC chip 302 via a high-density multi-channel optical transceiver 308 and a ribbon fiber 310. In one embodiment, high-density multi-channel optical transceiver 308 includes a pair of 12-channel high-density optical transceivers, such as a MicroPOD™ or MiniPod™; and ribbon fiber 310 can include a pair of 12-channel PRIZM® optical cable. Hence the eight MPO interfaces are coupled to 96 switch ports on ASIC chip 302, and each MPO interface can provide an aggregated bandwidth of 120 Gbps. Depending on the configuration of the servers, each MPO interface can be configured as 12 10 Gbps ports, three 40 Gbps ports, or one 100 Gbps port. In one embodiment of the present invention, ASIC chip 302 is an Ethernet switch chip. In a further embodiment, the MPO interfaces are configured to support 10 Gpbs, 40 Gbps, or 100 Gbps traffic during the Ethernet rate negotiation process. In addition, the SFP+ interfaces can each function as a dual speed $^{1}/_{10}$ Gbps Ethernet port. In some embodiments, ASIC chip 302 may further include a Fibre Channel (FC) switch chip, and the MPO interfaces can be configured to support 16GFC and 32GFC traffic.

As shown in FIG. 3A, compared with the SFP+ transceivers that are placed at the front panel of the switch, the high-density, multi-channel optical transceivers can be placed much closer to the switch ASIC chip. As a result, the trace line on the PCB can be much shorter, which significantly reduces various parasitic effects and simplifies PCB design. In addition, compared with traditional all-SFP+ solutions, replacing a large portion of the SFP+ ports with MPO ports based on high-density, multi-channel optical transceivers reduces total power usage as well as fabrication cost.

Figure 3B:
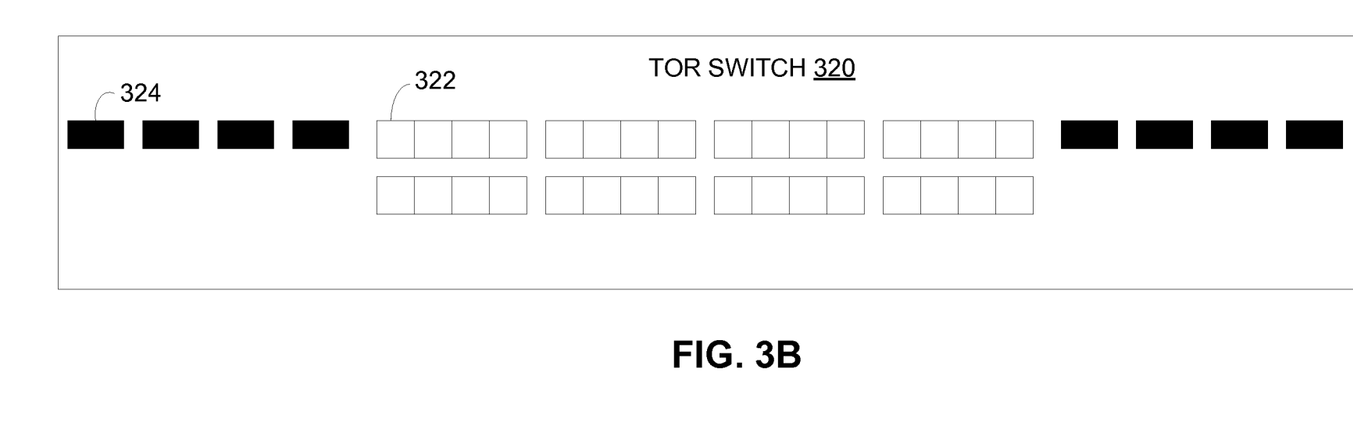
FIG. 3B presents a diagram illustrating the front panel of an exemplary TOR switch, in accordance with an embodiment of the present invention.

FIG. 3B presents a diagram illustrating the front panel of an exemplary TOR switch, in accordance with an embodiment of the present invention. In FIG. 3B, TOR switch 320 includes a number of SFP+ interfaces, such as an SFP+ interface 322; and a number of MPO interfaces, such as an MPO interface 324.

The SFP+ interfaces are electrical interfaces that provide coupling between SFP+ transceivers (which are not part of TOR switch 320) and the core switch chip within TOR switch 320. In one embodiment, each SFP+ interface provides up to 10 Gbps Ethernet connections, and is coupled to a 10 Gbps port on the core switch chip.

The MPO interfaces are optical interfaces that are coupled to the core switch chip within TOR switch 320 via high-density multi-channel optical transceivers, which can be integrated on the same PCB with the core switch chip. In one embodiment, each MPO interface provides coupling between an MPO cable with 24 fanned-out fibers and 12 10 Gbps ports on the core switch chip (with two fibers per port). The 24 fanned-out fibers are coupled to corresponding servers on the same rack. Note that, in one embodiment, the communication between TOR switch 320 and the corresponding servers is Ethernet based, and depending on the configuration of the servers, each MPO interface may serve as 12 10 Gbps Ethernet (10 GbE) ports, three 40 Gbps Ethernet (40 GbE) ports, or one 100 Gbps Ethernet (100 GbE) port. The port configurations are performed during the Ethernet auto-negotiation. In the example shown in FIG. 3B, TOR switch 320 includes eight MPO interfaces, which together provide up to 960 Gbps bandwidth. The total bandwidth provided by the 32 SFP+ interfaces and the eight MPO interfaces can reach 1.28 Tbps.

Figure 3C:
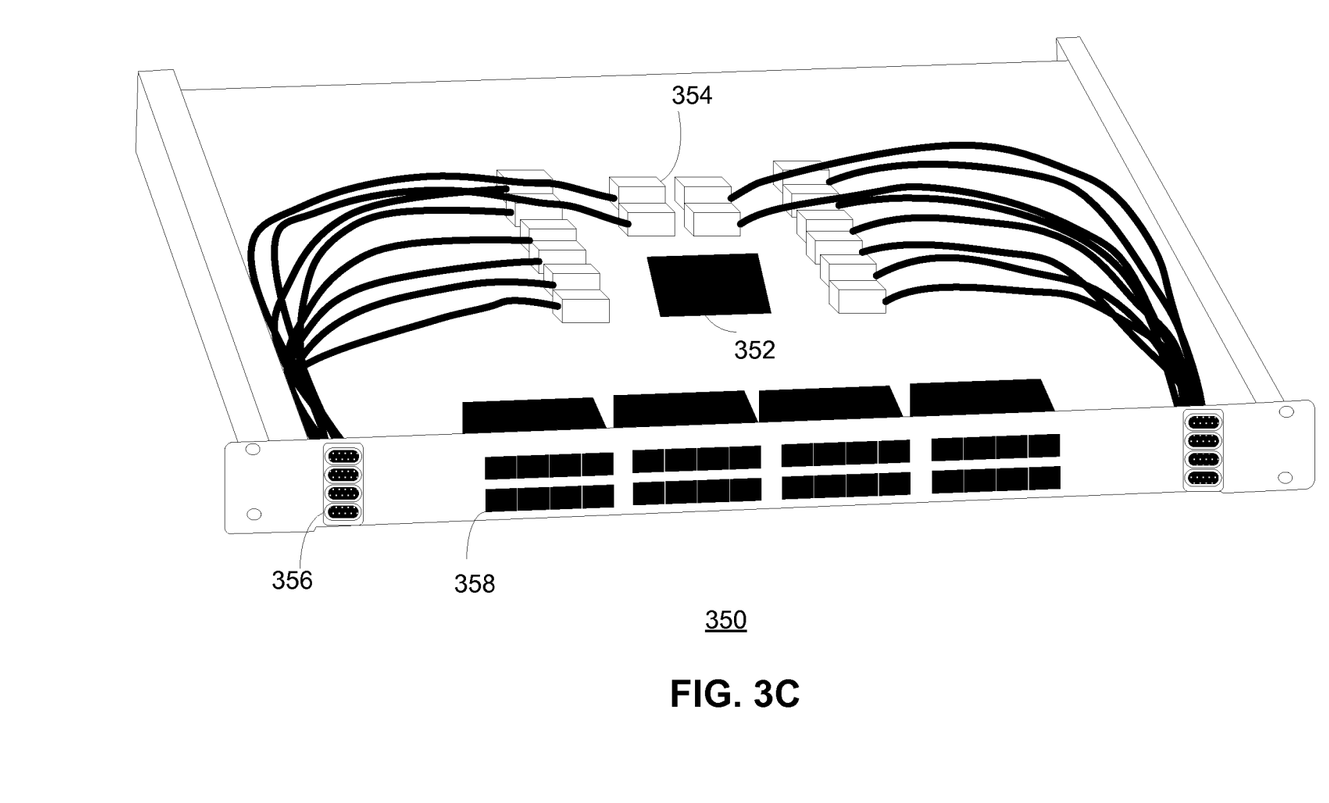
FIG. 3C presents a diagram illustrating a 3-dimensional drawing of an exemplary TOR switch, in accordance with an embodiment of the present invention.

FIG. 3C presents a diagram illustrating a 3-dimensional drawing of an exemplary TOR switch, in accordance with an embodiment of the present invention. In FIG. 3C, TOR switch 350 includes a switch ASIC chip 352; a number of high-density, multi-channel optical transceivers, such as a high-density, multi-channel optical transceiver 354; a number of MPO interfaces, such as an MPO interface 356; and a number of SFP+ interfaces, such as an SFP+ interface 358. Each MPO interface is coupled to switch ASIC chip 352 via a pair of high-density, multi-channel optical transceivers and a pair of fiber optic ribbon cables. In FIG. 3C, the metal traces that couple the high-density, multi-channel optical transceivers and SFP+ interfaces to switch ASIC chip 352 are not shown.

Figure 3D:
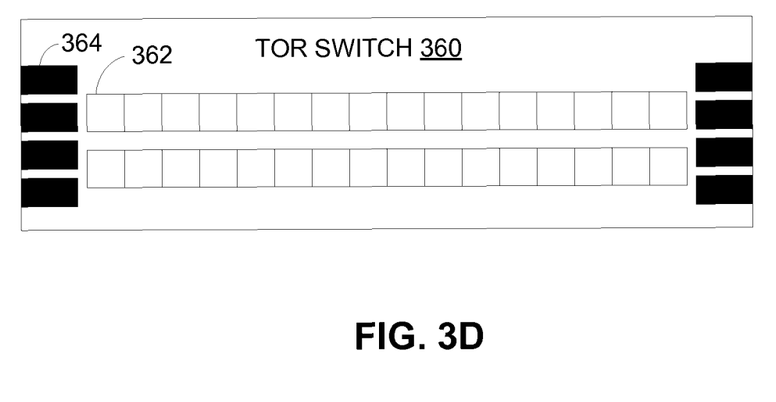
FIG. 3D presents a diagram illustrating the front panel of an exemplary TOR switch that occupies ½ RU, in accordance with an embodiment of the present invention.

In one embodiment, TOR switch 350 can fit into a 1 RU metal case (not shown in FIG. 3C), and can be mounted onto a standard server rack, which makes it an ideal candidate for data center applications. Also, one can see from FIG. 3C that there is potential to increase the bandwidth capacity of TOR switch 350 because there is still space available at its front channel, making it possible to fit more optical or electrical interfaces. In one embodiment, the width of TOR switch 350 can be reduced to the size of ½ RU, thus making it possible to fit two of these switches into 1 RU. Note that this highly compact switch solution has a potential to provide a switching bandwidth beyond 2 Tbps. FIG. 3D presents a diagram illustrating the front panel of an exemplary TOR switch that occupies ½ RU, in accordance with an embodiment of the present invention. In the example shown in FIG. 3D, TOR switch 360 includes 32 SFP+ interfaces, such as an SFP+ interface 362; and 8 MPO interfaces, such as an MPO interface 364. Note that in FIG. 3D all ports are arranged within close proximities of each other to ensure that the switch can fit into ½ RU.

Note that embodiments of the present invention provide a solution for increasing the port density on a switch. By combining embedded optics (high-density, multi-channel optical transceivers integrated on the same PCB with the switch ASIC) with traditional SFP+ interfaces, embodiments of the present invention achieve a switch with high port density and subscription flexibility. In addition to TOR switches, the same principle can be applied to other types of switches, such as modular switches. For example, when used as a modular switch, four of the MPO interfaces can be used to provide 480 Gbps uplink bandwidth in 48 uplinks, and the other four MPO interfaces and the 32 SFP+ interfaces together provide 800 Gbps downlink bandwidth in 80 downlinks. Similarly, in addition to 10 Gb Ethernet, each switch port can also support 40/100 Gb Ethernet, or Fibre Channel (such as 16GFC and 32GFC) traffic.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a printed circuit board (PCB);
   a plurality of multi-channel optical transceivers mounted on the PCB;
   a switch chip mounted on the PCB, wherein the switch chip comprises a plurality of ports;
   a plurality of interfaces accessible from a front panel of the switch;
   wherein the plurality of interfaces includes an electrical interface that is electrically coupled via the PCB to a port of the switch chip; and
   wherein the plurality of switch ports includes an optical interface coupled to a plurality of ports of the switch chip via the multi-channel optical transceivers mounted on the PCB, wherein the optical interface is capable of coupling a plurality of optical fibers.

2. The switch of claim 1, wherein the switch is a top-of-rack switch that fits in one standard rack unit.

3. The switch of claim 1, wherein the switch is a modular switch that occupies multiple standard rack units.

4. The switch of claim 1, wherein the plurality of ports of the switch chip includes at least 128 10-Gigabit Ethernet (10GbE) ports.

5. The switch of claim 4, wherein the optical interface is coupled to 12 10GbE ports of the switch chip.

6. The switch of claim 5, wherein the optical interface can be configured to act as one of:
   a 100GbE port;
   three 40GbE ports; and
   12 10GbE ports.

7. The switch of claim 1, wherein the electrical interface includes an enhanced small form-factor pluggable (SFP+) interface.

8. The switch of claim 1, wherein the optical interface includes a multi-fiber push on (MPO) interface.

9. The switch of claim 8, wherein the MPO interface is coupled to the respective multi-channel optical transceiver via a fiber optic ribbon cable.

10. The switch of claim 1, wherein the switch chip further includes a number of Fibre Channel (FC) ports.

11. A printed circuit board (PCB) for a switch, comprising:
    a plurality of multi-channel optical transceivers mounted on the PCB; and
    a plurality of access interfaces mounted on an edge of the PCB;
    a switch chip mounted on the PCB, wherein the switch chip comprises a plurality of ports;
    wherein a first access interface of the plurality of access interfaces includes an electrical interface that is electrically coupled via the PCB to a port of the switch chip; and
    wherein a second access interface of the plurality of access interfaces includes an optical interface coupled to a plurality of ports of the switch chip via the multi-channel optical transceivers mounted on the PCB, wherein the optical interface is capable of coupling a plurality of optical fibers.

12. The PCB of claim 11, wherein the PCB fits into a top-of-rack switch that fits in one standard rack unit.

13. The PCB of claim 11, wherein the PCB fits into a modular switch that occupies multiple standard rack units.

14. The PCB of claim 11, wherein the plurality of ports of the switch chip includes at least 128 10-Gigabit Ethernet (10GbE) ports.

15. The PCB of claim 14, wherein the optical interface is coupled to 12 10GbE ports of the switch chip.

16. The PCB of claim 15, wherein the optical interface can be configured to act as one of:
    a 100GbE port;
    three 40GbE ports; and
    12 10GbE ports.

17. The PCB of claim 11, wherein the electrical interface includes an enhanced small form-factor pluggable (SFP+) interface.

18. The PCB of claim 11, wherein the optical interface includes a multi-fiber push on (MPO) interface.

19. The PCB of claim 18, wherein the MPO interface is coupled to the respective multi-channel optical transceiver via a fiber optic ribbon cable.

20. The PCB of claim 11, wherein the switch chip further includes a number of Fibre Channel (FC) ports.

* * * * *